US007200616B2

(12) United States Patent
Takeuchi et al.

(10) Patent No.: US 7,200,616 B2
(45) Date of Patent: Apr. 3, 2007

(54) INFORMATION MANAGEMENT SYSTEM, CONTROL METHOD THEREOF, INFORMATION MANAGEMENT SERVER AND PROGRAM FOR SAME

(75) Inventors: Keisuke Takeuchi, Kunitachi (JP); Akira Morita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 467 days.

(21) Appl. No.: 10/770,584

(22) Filed: Feb. 4, 2004

(65) Prior Publication Data
US 2005/0193250 A1    Sep. 1, 2005

(30) Foreign Application Priority Data
Dec. 25, 2003    (JP)    ............................. 2003-429064

(51) Int. Cl.
G06F 17/00    (2006.01)
G06F 7/00    (2006.01)
(52) U.S. Cl. ...................... 707/104.1; 707/10; 709/224
(58) Field of Classification Search ................ 707/2–5, 707/10, 104.1, 201; 709/200, 219, 224, 229
See application file for complete search history.

(56) References Cited

U.S. PATENT DOCUMENTS 6,205,434 B1* 3/2001 Ryan et al. ............... 705/36 R
6,574,655 B1* 6/2003 Libert et al. ................ 709/200
6,920,463 B2* 7/2005 Kishimoto ................ 707/104.1
7,013,313 B1* 3/2006 LaRue ......................... 707/201
7,058,660 B2* 6/2006 Scott ......................... 707/104.1
2001/0044737 A1 11/2001 Halligan et al.
2003/0160818 A1 8/2003 Tschiegg et al.
2004/0010605 A1* 1/2004 Furukawa et al. .......... 709/229

FOREIGN PATENT DOCUMENTS

JP    2002-24526    7/2000

* cited by examiner

Primary Examiner—Greta Robinson
Assistant Examiner—Jacques Veillard
(74) Attorney, Agent, or Firm—Reed Smith LLP; Stanley P. Fisher, Esq.; Juan Carlos A. Marquez, Esq.

(57) ABSTRACT

An information management system to simplify the calculation of risk values and information asset risk management, based on both information on asset values and access to information. The information management system is composed of a storage device to store information containing asset values, a file access information report section for monitoring access to information stored in that storage device, a file attribute information management section to manage information on file attributes stored in that storage device, a risk value processor to calculate risk values of the applicable information based on attribute information managed by said file attribute information management section and based on monitoring results from the file access information report section, and a corrective action initiator to take measures to correct leaks of applicable information based on results calculated by the risk value processor.

11 Claims, 13 Drawing Sheets

FIG. 6A

| TYPE | PRODUCT SPECIFICATIONS |
|---|---|
| STATUS | ASSET VALUE FLUCTUATION RATE |
| DRAFTING DOCUMENT | 1.0 |
| DEVELOPMENT IN-PROGRESS | 1.0 |
| DEVELOPMENT COMPLETE | 0.5 |
| PRODUCTION COMPLETE | 0.3 |
| SUPPORT COMPLETE | 0.0 |

FIG. 6B

| TYPE | PATENT SPECIFICATIONS |
|---|---|
| STATUS | SECRECY LEVEL |
| DRAFTING DOCUMENT | 10 |
| AWAITING APPLICATION | 10 |
| APPLICATION | 10 |
| APPLICATION LAID-OPEN | 0 |
| PATENT ESTABLISHED | 0 |
| PERIOD EXPIRED | 0 |
| DISCARDING OF RIGHTS | 0 |

FIG. 7

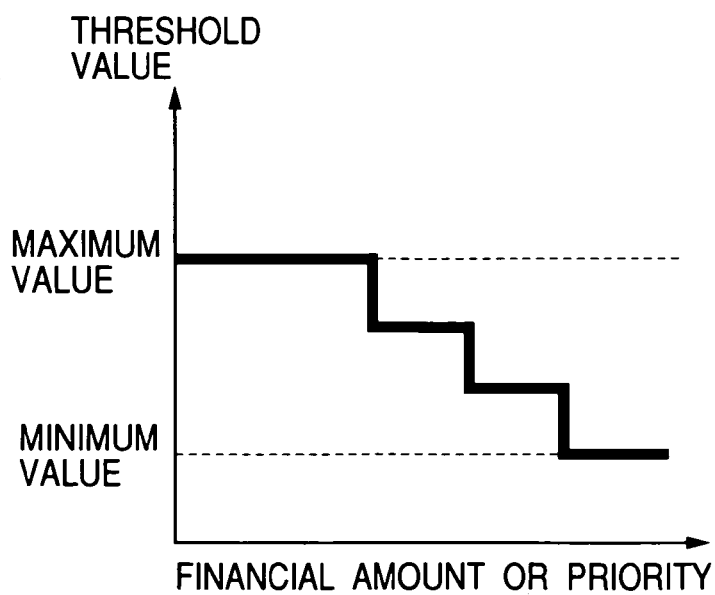

INFORMATION MANAGEMENT SYSTEM, CONTROL METHOD THEREOF, INFORMATION MANAGEMENT SERVER AND PROGRAM FOR SAME

FIELD OF THE INVENTION

The present invention relates to an information management system for managing the storage of information containing asset values, and relates in particular to risk assessment of information.

BACKGROUND OF THE INVENTION

Technology has been disclosed in the related art (See for example patent document 1.) for speedily evaluating and selecting actions or countermeasures to protect information assets from security breaches. This technology utilizes an action augmentation rate calculating means to find the sum of risk reduction rates for each evaluation item from among an action definition file containing names of potential countermeasures, their risk ratios and evaluation item names linked to a corresponding potential countermeasure name, and applicable data that was entered as countermeasure name data. The sum of the risk reduction ratios for applicable actions matching these evaluation items is found for the first sum and the action augmentation rate is calculated as the ratio of these two sums.

An information management system was also disclosed in the related art, for managing risk management information based on analysis results of the danger of sustaining damage in disasters such as fires (See for example patent document 2.).

Another information management system was disclosed in the related art for entering initial (default) parameters such as the priority of confidential information and the degree of safety of storage locations, and calculating values equivalent to risk values (See for example patent document 3.).

[Patent document 1] JP-A No. 24526/2002
[Patent document 2] US Patent. No. 2003/0160818
[Patent document 3] US Patent No. 2001/0044737

These types of information management systems were effective in converting the risk of information leaks into numerical values for management. However, these examples of the related art were only able to consider one type of phenomenon as a cause in making risk values fluctuate, and were incapable of managing the risk of information leakage from different causes with just one risk value. These systems of the related art further failed to consider that the value of information fluctuates along with the passage of time and were unable to make correct risk assessments. No administrator was appointed for managing the risk default values, and the system was difficult to operate. The system further did not refer to past risk values.

SUMMARY OF THE INVENTION

In other words, there is a need for an information management system to simplify the calculation of risk values and managing information asset risks based on both access to information and to information on asset values.

The present invention is therefore characterized by comprising: a storage device to store information containing asset values, a file access information report section for monitoring access to information stored in that storage device, a file attribute information management section to manage information on file attributes stored in that storage device, a risk value processor to calculate risk values of the applicable information based on attribute information monitored by said file attribute information management section and based on monitoring results from the file access information report section, and a corrective action initiator to take measures to correct leaks of applicable information based on results calculated by the risk value processor.

The present invention is capable of evaluating risks from fluctuations in asset values due to accessing of information containing asset values, and to fluctuations in the asset value of information due to the passage of time. The present invention can therefore evaluate risks according to the accessing of information of different types.

BRIEF DESCRIPTION OF THE DRAWINGS

FIG. 6A is a table showing the secrecy level pattern utilized when finding the update risk value in the first method for calculating risk values in the embodiment of the present invention;

FIG. 6B is a table showing the secrecy level pattern utilized when finding the update risk value in the first method for calculating risk values in the embodiment of the present invention;

FIG. 7 is a graph showing the mapping function utilized when finding the loss figure in the second method for calculating risk values in the embodiment of the present invention;

DETAILED DESCRIPTION OF THE PREFERRED EMBODIMENTS

Figure 1:
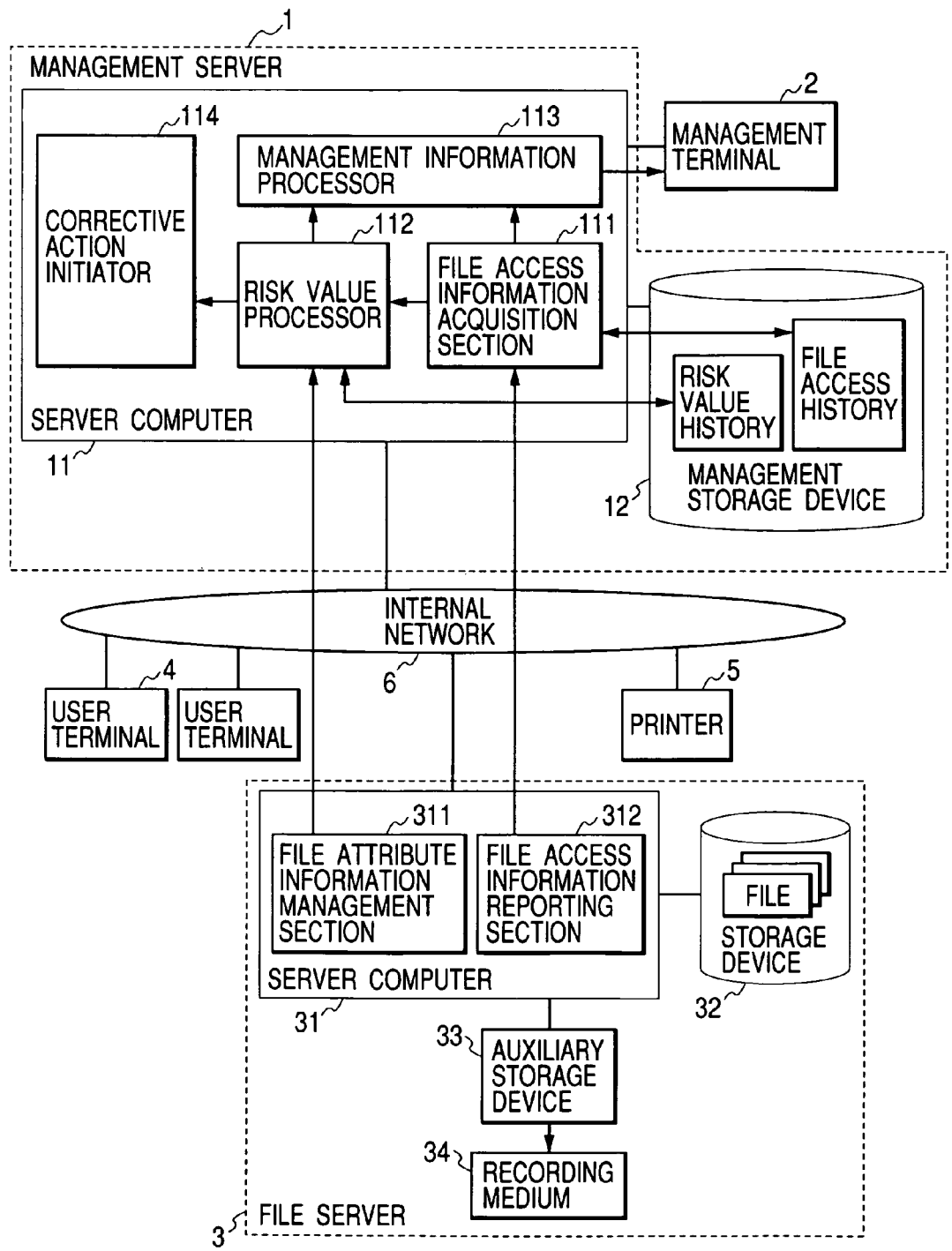
FIG. 1 is a block diagram showing the structure of the information processing system of the first embodiment of the present invention.

The embodiments of the present invention are described next while referring to the drawings.

(System Structure)

FIG. 1 is a block diagram showing the information processing system of the first embodiment of the present invention;

The information processing system of the first embodiment is composed of a management server 1 for controlling file access from a user terminal 4, a management terminal 2 for entering commands to the management server 1, a file server 3 to store and manage information to supply to the user terminal 4, multiple user terminal 4 for searching information stored in the file server 3, and a printer 5 for printing the information stored in the file server 3 when commanded by the user terminal 4.

The management server 1, the file server 3, the user terminal 4, and the printer 5 are connected via the internal network 6. In the present embodiment, the management terminal 2 is directly connected to the management server 1. However, the management terminal 2 may also be connected to the management server 1 by way of an internal network. A management terminal 2 connected to the management server 1 by way of an internal network does not have to be installed at a position near the management server 1 and the management server 1 can be operated and monitored from a management terminal 2 installed at a remote location.

The management server 1 is made up of a server computer 11 and a management storage device 12. The server computer 11 contains a CPU, a memory and an interface to run the software and is composed of a file access information acquisition section 111, a risk value processor 112, a management information processor 113, and a corrective action initiator 114.

The file access information acquisition section 111 is run by software. When notification of a file access is received from the file server 3(or the file server 3 is accessed and information acquired), the file access information acquisition section 111 decides if accessing the file is causing the risk value to change or not. If that file access is causing the risk value to change, then that information (change in risk value) is reported to the risk value processor 112 and is recorded in the file access history in the management storage device 12. The file access information acquisition section 111 acquired the file access history recorded in the management storage device 12 and sends that history to the management information processor 113 if required.

The risk value processor 112 is run by software. The risk value processor 112 calculates the risk value from the file attribute information reported from the file server 3. The risk value processor 112 receives the report on the file access from the file access information acquisition section 111 and rewrites (updates) the risk value. The corrective action initiator 114 is notified if this updated risk value exceeds the pre-established threshold value. This calculated and updated (rewritten) risk value is recorded in the management storage device 12 as risk value history. The risk value processor 112 acquires the risk value history recorded in the management storage device 12 and sends this history to the management information processor 113 if required.

The management information processor 113 is composed of software. The management information processor 113 receives instructions from the management terminal 2, and acquires a history of file access from the file access information acquisition section 111. The management information processor 113 also acquires the risk values from the risk value processor 112 and displays them on the management terminal 2 in the specified format.

The corrective action initiator 114 is made up of software. When notified by the risk value processor 112 that the risk value has exceeded the threshold, the corrective action initiator 114 performs a pre-defined corrective action on the applicable file. This corrective action initiator 114 launches a corrective action based on one risk value that covers multiple causes and can therefore render a suitable corrective action (countermeasure) in response to accessing different types of information.

The corrective action initiated by the corrective action initiator 114 is a warning on the screen of management terminal 2 urging the administrator to use caution by restricting file access. A warning is also sent to the screen of data writer user terminal 4 to urge the data writer to use caution and take corrective action (for example by altering information to make the risk of information leaks smaller or to reevaluate the information leakage risk). Other methods may include sending a warning to the screen of user terminal 4 urging the user holding access rights to use caution and informing that the leakage risk has increased, etc.

The applicable (risk) file can also be shifted to a designated folder of storage device 32 and access restricted to only those users having the specified access right. The applicable (risk) file may also be deleted from the storage device 32. Access (searches, copying and printing, etc.) to the applicable (risk) file can also be prohibited. Access to the applicable file can also be recorded. For example, the date/time, file name, cause of change in risk value, pre-change risk value, post-change risk value, address of the access source, and user name of the access source can be recorded. By automatically adding access restrictions in this way to files where the risk has exceeded the threshold value, corrective action (countermeasures) can speedily be taken, and the danger of information leaks due to delays in corrective action can be reduced. By acquiring an access record of files that exceeded their risk threshold, the involved parties can be identified when information leaks occur later on.

The management storage device 12 may for example be a magnetic disk device for storing risk values and file access history information.

The management terminal 2 contains input devices such as a keyboard and mouse as well as a display device. The management terminal 2 specifies (instructs) and displays the output of information stored in the management server 1, and also makes settings on the management server 1. The input devices and display devices of management terminal 2 may be directly connected to the server computer 11 of management server 1, or the management server 2 and server computer 11 may be separate computers.

The file server 3 is made up of a server computer 31 and a storage device 32. The server computer 31 is composed of a CPU and a memory to run different types of software and further contain a file attribute information management section 311 and a file access information reporting section 312.

The file attribute information management section 311 is run by software and receives registration (storage) and updates of attribute information (confidentiality level, asset value, writer, administrator, permission information, etc.) for all files stored in the storage device 32, and notifies the management server 1 if an update occurs. For example, if the confidentiality level of a file changes due to the passage of time or the progress of a task then that change is reported to the management server 1.

The file access information reporting section 312 is run by software and monitors communications with the file server 3. When this reporting section 312 detects accessing of a file stored in the storage device 32, it analyzes the type of access and that communication party and makes a report to the management server 1. Types of file access being monitored might include a file search, copying of the file onto the file server 3, copying the file onto the user terminal 4, copying the file onto the recording medium 34, and printing of the file by the printer 5.

Rather than the file server 3 notifying the management server 1 about attribute information updates managed by the file attribute information management section 311, and detection of file accessing by the file access information reporting section 312, the management server 1 can instead make inquiries to the file server 3 and acquire information recorded by file attribute information management section 311 and file access information reporting section 312.

The storage device 32 is for example a magnetic disk device for recording the information assets in a file format.

An auxiliary storage device 33 may be connected to the file server 3. The auxiliary storage device 33 records files onto a recording medium 34 such as a floppy disk or optical disk capable of rewriting or recording memos, etc. The auxiliary storage device 33 is used to bring out or back up data stored in the storage device 32. The file access information reporting section 312 monitors the writing of data onto the recording medium 34 via the auxiliary storage device 33 as described above. The management server 1 rewrites the risk values of the applicable information by copying data onto the recording medium 34.

The user terminal 4 is a computer containing a CPU, a memory and an interface. Files are sometimes stored within the user terminal 4. In that case, the user terminal 4 is also composed of an attribute information management section 311 and file access information reporting section 312, the same as the file server 3.

Figure 2:
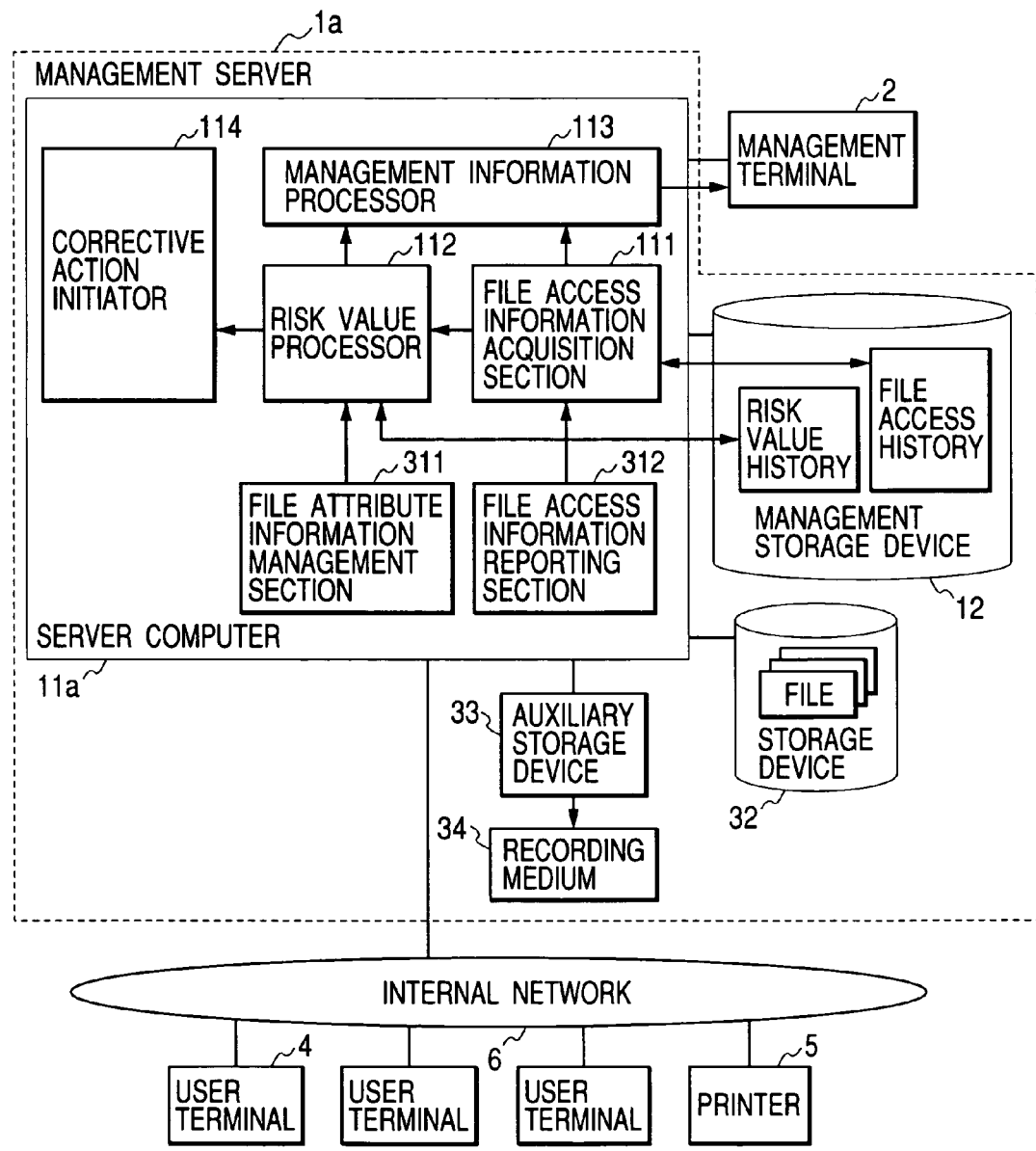
FIG. 2 is a block diagram showing the structure of the information processing system of the second embodiment of the present invention.

FIG. 2 is a block diagram showing the information processing system of the second embodiment of the present invention.

The second embodiment differs only in the point that the management server 1a contains the functions of the file server 3 in the first embodiment. The structure of the second embodiment is in all other respects identical to the first embodiment. The same reference numerals are assigned to sections identical to the structure of the first embodiment and a detailed description of those sections is omitted.

The information processing system of the second embodiment is made up of a management server 1a to control file access from the user terminal 4 and to store and manage information to provide to the user terminal 4, a management terminal 2 to enter instructions to the management server 1a, multiple user terminal 4 to search information stored in the management server 1a, and a printer 5 to print information stored in the management server 1a upon receiving instructions from the user terminal 4.

The management server 1a, user terminal 4 and printer 5 are connected by way of an internal network 6. The management terminal 2 in the present embodiment is directly connected to the management server 1a, however the management terminal 2 may be connected to the management server 1a by way of an internal network.

The management server 1a is made up of a server computer 11a, a management storage device 12 and a storage device 32. The server computer 11a contains a CPU, a memory and an interface to run the software and is composed of a file access information acquisition section 111, a risk value processor 112, a management information processor 113, a corrective action initiator 114, an attribute information management section 311 and file access information reporting section 312.

The management server 1a of the second embodiment of the present invention has the functions of the file server 3 of the first embodiment so management tasks can be reduced, and maintenance and management costs can be lowered. The notification issued when a file is accessed can be processed internally in the management server 1 without having to transit the internal network 6 so that network traffic can also be reduced.

Figure 3:
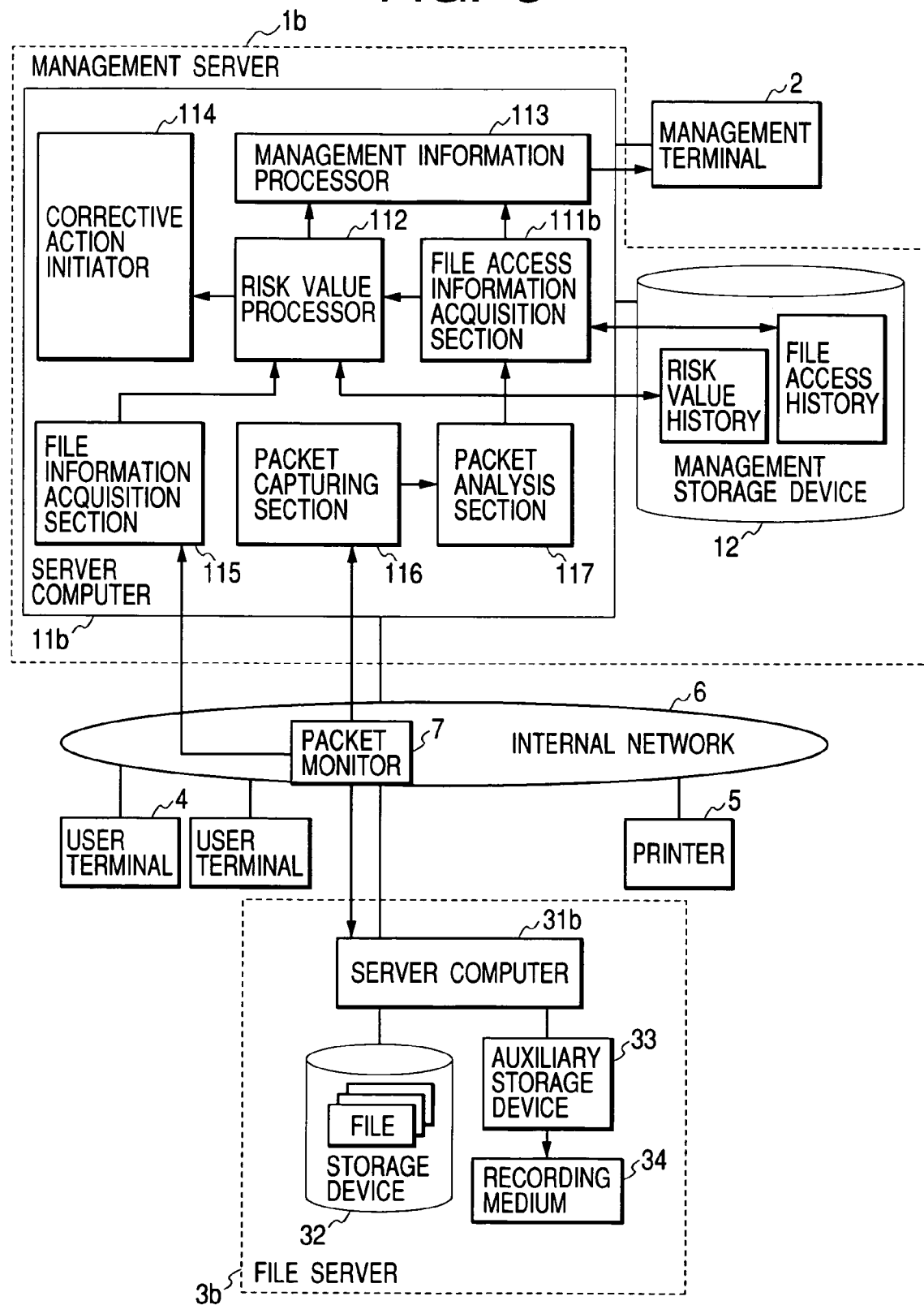
FIG. 3 is a block diagram showing the structure of the information processing system of the third embodiment of the present invention.

FIG. 3 is a block diagram showing the information processing system of the third embodiment of the present invention.

The third embodiment differs in that the management server 1b monitors access to the file server 3b by way of a packet monitor 7 installed in the internal network 6. The structure of the third embodiment is in all other respects identical to the first embodiment. The same reference numerals are assigned to sections identical to the structure of the first embodiment and a detailed description of those sections is omitted.

The information processing system of the third embodiment is made up of a management server 1b to control file access from the user terminal 4, a management terminal 2 to enter instructions to the management server 1b, a file server 3b to store and manage information to provide to the user terminal 4, multiple user terminals 4 to search information stored in the file server 3b, a printer 5 to print information stored in the file server 3b upon receiving instructions from the user terminal 4, and a packet monitor 7 to monitor packets sent over the network.

The management server 1b, file server 3b, user terminal 4, printer 5 and packet monitor 7 are connected by way of an internal network 6. The management terminal 2 in the present embodiment is directly connected to the management server 1b, however the management terminal 2 may be connected to the management server 1b by way of an internal network.

The management server 1b is made up of a server computer 11b and a management storage device 12. The server computer 11b contains a CPU, a memory and an interface to run the software and is composed of a file access information acquisition section 111b, a risk value processor 112, a management information processor 113, a corrective action initiator 114, a file information acquisition section 115, a packet catch section 116 and a packet analysis section 117.

The file information acquisition section 115 is run by software and acquires information from the file server 3b and user terminal 4 at a specified timing (for example, periodically). The file information acquisition section 115 configures a database of files stored in the file server 3b and user terminal 4, and collects and manages that attribute information. For example, the file information acquisition section 115 changes the confidentiality level of the attribute information of the file due to the passage of time or the progress of a task. The information acquisition section 115 also requests the entry of attribute information when a newly created file is found.

The packet catch section 116 is run by software, and catchs and sends packets on the internal network monitored by the packet monitor 7, to the packet analysis section 117.

The packet analysis section 117 is run by software, and analyzes the contents of packets sent from the packet catch section 116. The packet analysis section 117 also decides whether to refuse access to a file that might cause a risk value to fluctuate. If access to a file is causing the risk value of a catched packet to fluctuate, then those contents are reported to the file access information acquisition section 111*b*. Types of file access monitored by the packet analysis section 117 are file searches, copying of the file onto the file server 3*b*, copying the file onto the user terminal 4, copying the file onto the recording medium 34, and printing of the file by the printer 5.

The file access information acquisition section 111*b* records the contents of the file access reported by the packet analysis section 117 onto the management storage device 12 and leaves a history. The acquisition section 111*b* also searches the file access history recorded in the management storage device 12, and sends it to the management information processor 113 if required.

The functions of the risk value processor 112, a management information processor 113, and a corrective action initiator 114 are identical to those of the first embodiment previously described.

The file server 3*b* is made up of a server computer 31*b* and a storage device 32. The server computer 31*b* is composed of a CPU and a memory. Unlike the first embodiment, the server computer 31*b* does not contain an attribute information management section 311 and file access information reporting section 312.

The auxiliary storage device 33 may be connected to the file server 3*b*. The auxiliary storage device 33 records a file onto a writable recording device or rewritable recording medium 34 such as a floppy disk or optical disk.

The user terminal 4 is a computer containing a CPU, a memory and an interface. Unlike the first embodiment, there is no need for an attribute information management section 311 and file access information reporting section 312, even in cases where files are stored in the user terminal 4.

In this third embodiment, there is no need for the file server 3*b* and user terminal 4 to inform other devices when accessing of data stored in the storage device 32 is detected. So there is no need to add a new function to the file server 3*b* and user terminal 4, and the present invention can easily be applied to already existing information processing systems.

(Defining Risk Values, First Calculation Method)

The first method for calculating risk values of the present embodiment is described next.

(1) First of all, "0" is set as the minimum information risk value. Risk values for information having no restrictions on disclosure (for example, values that can be disclosed inside or outside the company) are given a risk value of "0".

(2) Next, a maximum risk value for the information is set. The information is judged to have leaked when the risk value reaches the maximum value.

(3) A threshold risk value smaller than the maximum risk value is then set to activate the corrective action initiator 114 to implement a corrective action (countermeasure). Thresholds can be set at multiple steps according to the type of corrective action. For example, thresholds can be set in three steps of "High", "Medium", "Low" of the danger level. Setting thresholds at multiple steps allows taking different corrective action at different levels. For example, a threshold can be set at a value lower than the automatic corrective action threshold to warn the user or administrator that access is prohibited, etc. A caution or sign can in this way be reported to the administrator or user to warn of increasing danger of information leakage, so that corrective action can be taken at an early stage.

Figure 4A:
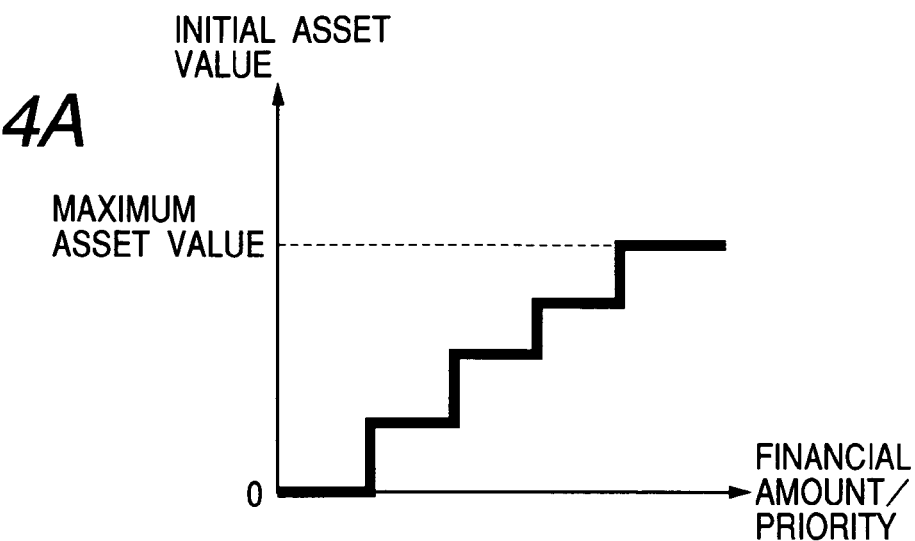
FIG. 4A is a graph of the mapping function utilized when finding the initial asset value in the first method for calculating risk values in the embodiment of the present invention.
Figure 4B:
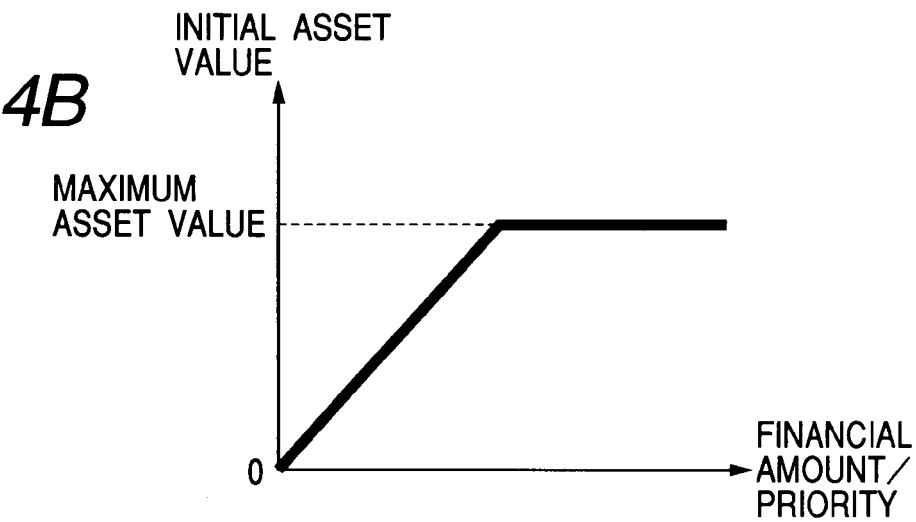
FIG. 4B is a graph of the mapping function utilized when finding the initial asset value in the first method for calculating risk values in the embodiment of the present invention.
Figure 4C:
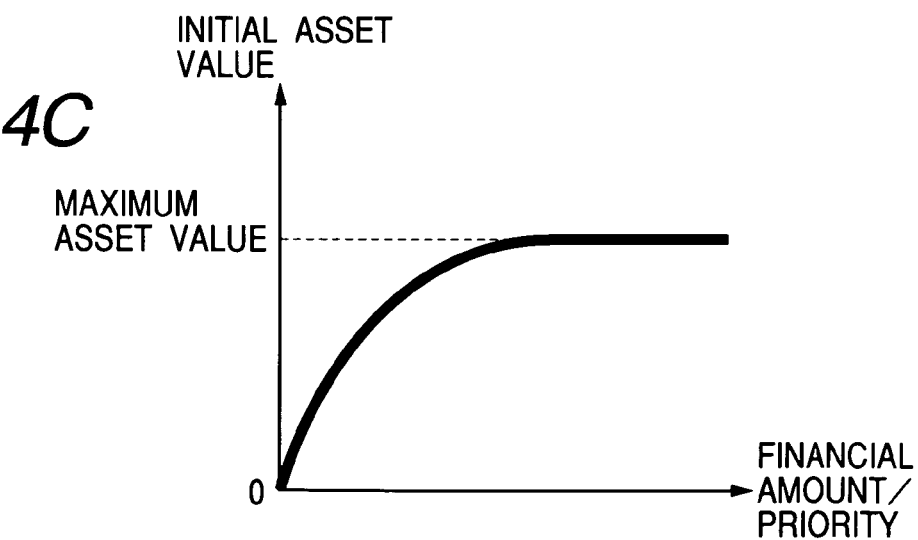
FIG. 4C is a graph of the mapping function utilized when finding the initial asset value in the first method for calculating risk values in the embodiment of the present invention.

(4) The loss figure due for example to leakage of information assets can be rated, and an initial asset value set that is smaller than a pre-established threshold value. By applying this initial asset value for example to the information value (loss figure) in the mapping function shown in FIGS. 4A to 4C, mapping can be performed up to an upper limit (maximum asset value) value and an initial asset value established. More specifically, the initial asset values can be separated into steps up to a maximum asset value, and linked to the loss figures in each section as shown in FIG. 4A. The initial asset value and the loss figure are also measured in proportion to each other up to a maximum asset value as shown in FIG. 4B. The initial asset value and the loss figure can be made to correspond to each other as shown in FIG. 4C by using a specified function, for the loss figure and initial asset value up to a maximum asset value (for example, a specific function such as an exponential function, where there is a large change in the maximum asset value when the loss figure is small, and a small change in the maximum asset value when the loss figure is large). In either of these cases, the initial asset value is set so as not to exceed the maximum asset value even when the loss figure increases. The priority level of the information (secrecy level such as confidentiality, secrecy, or company secrets) may also be used instead of the loss figure.

(5) The danger level of the storage location for the information asset is then rated and a numerical value from "0" to "1" is set. The danger level of this storage location is determined by the storage status such as whether access rights at the file storage location are limited or whether the file is stored in encrypted form. The higher the value, the greater the danger.

(6) The initial value of the risk value is then defined as:

Initial value=initial asset value×danger level at storage location. The initial value of information whose disclosure is not restricted (no access restrictions) is set as "0".

Figure 5A:
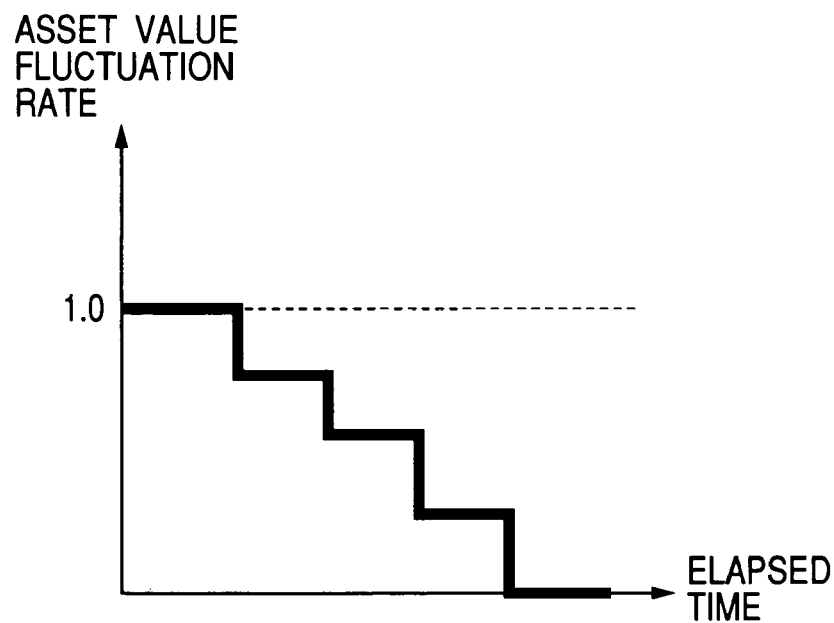
FIG. 5A is a graph for describing the function utilized when finding the asset value fluctuation rate in the first method for calculating risk values in the embodiment of the present invention.
Figure 5B:
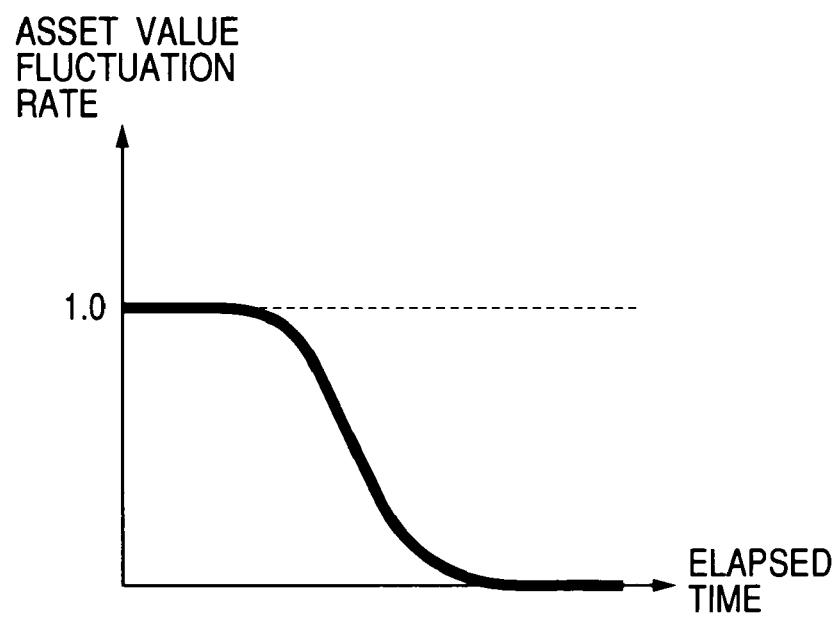
FIG. 5B is a graph for describing the function utilized when finding the asset value fluctuation rate in the first method for calculating risk values in the embodiment of the present invention.

(7) The asset value fluctuation rate over elapsed time is then calculated. The asset value fluctuation rate for example, is given a value of 1 when an information asset is newly made as shown in FIG. 5, and a function is defined for the decline in the information asset value over time. More specifically, the elapsed time is divided into multiple sections as shown in FIG. 5A, and asset value fluctuation rates are defined in multiple steps corresponding to those time divisions. The elapsed time and the asset value fluctuation rate are also linked to each other by a specified function as shown in FIG. 5B. The asset value fluctuation rate is set as "1" when the elapsed time is not taken into account.

(8) The asset value at the point in time that a specific time has elapsed is calculated as:

Asset value=initial asset value×asset value fluctuation rate at applicable point in time.

(9) The danger level linked to information leakage for different types of access to information assets is rated. The access types are defined by a numerical value from "0" to "1" per the access source (inside company, or outside company), access purpose (copying or printing of accessed file). This access danger level is set so that the higher the value, the greater the danger level.

(10) The risk value fluctuation amount accompanying access to the information asset is then calculated as:

Risk value fluctuation amount=(asset value/maximum asset value)×(maximum risk value−maximum asset value)×access danger level.

The risk value fluctuation amount accompanying access to information whose disclosure is not restricted (no access restrictions) is set as "0". This (maximum risk value−maximum asset value) is a fixed coefficient in functions making the asset value and maximum asset value into variables for scaling (expandability) the risk value fluctuation amount.

(11) The risk value fluctuation amount after an information asset has been accessed is then calculated. That risk value is then increased to match just the calculated amount of calculated. The risk value is lowered in file access cases where file encryption is not needed or when accessed to change a file to a non-encrypted file.

(12) The risk update value is next defined (increase or decrease in value, value automatically set to 0, etc.). These risk update values may be utilized when the asset value fluctuation rate has changed over the passage of time (See FIG. 5.).

The asset value fluctuation rate that changes with the progress of the task involving the information asset may also be used (See FIG. 6A.). In this case, a pattern of confidentiality (secrecy) levels matching the task progress is made in advance. For example, in the asset value fluctuation rate for product specifications shown in FIG. 6A, the status (task status) of the development work changes from "Development in-progress" to "Development complete" as the task progresses and the asset value fluctuation rate changes from 1.0 to 0.5 so that the risk value reaches 0.5 times. However if the asset value fluctuation rate has already dropped by 0.5 due to the passage of time before changing from "Development in-progress" to "Development complete", then the asset value fluctuation rate may be changed (increased) based on the task progress, or the asset value fluctuation rate may be left unchanged as the task progresses.

The confidentiality level that changes with the progress of the task (laid open application) may also be utilized (See FIG. 6B.). The disclosure (laying open) of an application is generally one year and six months after the application and the confidentiality level may change due to the passage of time. The risk value can also be defined according to the progress of the task.

The value corresponding to the status and the value from the change over time (for example, from the product of the value corresponding to the status and the value from the change over time) may be used to calculate the asset value fluctuation rate. More specifically, the new asset value fluctuation rate is 0.2=0.4×0.5 at the point in time that the asset value fluctuation rate for the information asset "Development in-progress" has reached 0.4 over the passage of time and the status has changed to "Development complete".

(13) The applicable risk value can then be updated (rewritten) when the progress of the task has been input. The progress of the task can be automatically detected and the applicable risk value updated. For example, if the task has progressed due to the passage of time such as in the disclosure of an application one year and six months after the patent application, then the applicable risk value can be updated (rewritten) by detecting the elapsed time.

(14) If the file has been copied, then along with increasing the risk value by the specified amount, a larger risk value is also set for the copied information.

Therefore, in this first calculation method, one risk value can be easily calculated that reflects multiple causes, by utilizing a mapping function (initial asset value mapping function (FIG. 4), asset value fluctuation ratio (FIG. 5)), and the information risk values for accessing different types of information can be accurately and easily managed.

(Defining Risk Values, Second Calculation Method)

The second method for calculating risk values of the present embodiment is described next.

The second calculation method differs in that mapping utilizes thresholds from loss figures or priority levels rather than mapping risk values from loss figures and priority levels as performed in the first calculation method.

(1) First of all, "0" is set as the minimum information risk value. Risk values for information having no restrictions on disclosure (for example, values that can be disclosed inside or outside the company) are given a risk value of "0".

(2) A maximum risk value for the information is next set. The information is judged to have leaked when the risk value reaches the maximum value.

(3) An initial asset value for information values shared by all the information is set. In other words, unlike the first calculation method, the initial risk value of the present method does not include cost figure or priority level elements. The initial asset value may be set according to the danger level of the storage location.

(4) The loss figure (or information priority level) from exposure of information assets is also rated, and those results mapped in a range with numerical figures using a mapping function. In the mapping function shown in FIG. 7, the loss figures are divided into multiple sections, and a step-type function can then set risk values in multiple steps matching each (loss figure) section. Risk value thresholds are then set to make the corrective action initiator 114 take corrective action. This threshold is set larger than the initial asset value and smaller than the maximum risk value (initial asset value<threshold<maximum risk value). Thresholds can be set in multiple stages according to the type of corrective action (that is needed). In other words, in this second method, the higher the information value (information with high loss figures, information with a high priority figure) the smaller the threshold setting.

Processing identical to steps (5) through (14) of the first calculation method is then executed. In other words, the rating of the information asset danger level at the storage location (5), the defining of the initial risk value (6), the calculation of the asset value fluctuation rate (7), the calculation of the asset value (8), the setting of the danger level according to type of access (9), the calculation of risk value fluctuation amount (10), increasing or decreasing the risk value (11), calculating the risk update value (12), updating the risk value (13), and setting the risk value of copied information (14) is identical to the process of the first calculation method.

The second calculation method in this way sets an identical initial asset value for all information assets, and decides the risk of information leakage by changing the risk thresholds into information values. The troublesome and complicated task of setting initial asset values is therefore eliminated and the risk of information leakage can be controlled.

(Risk Value Display)

The display of risk values in the present embodiment is described next.

Figure 8:
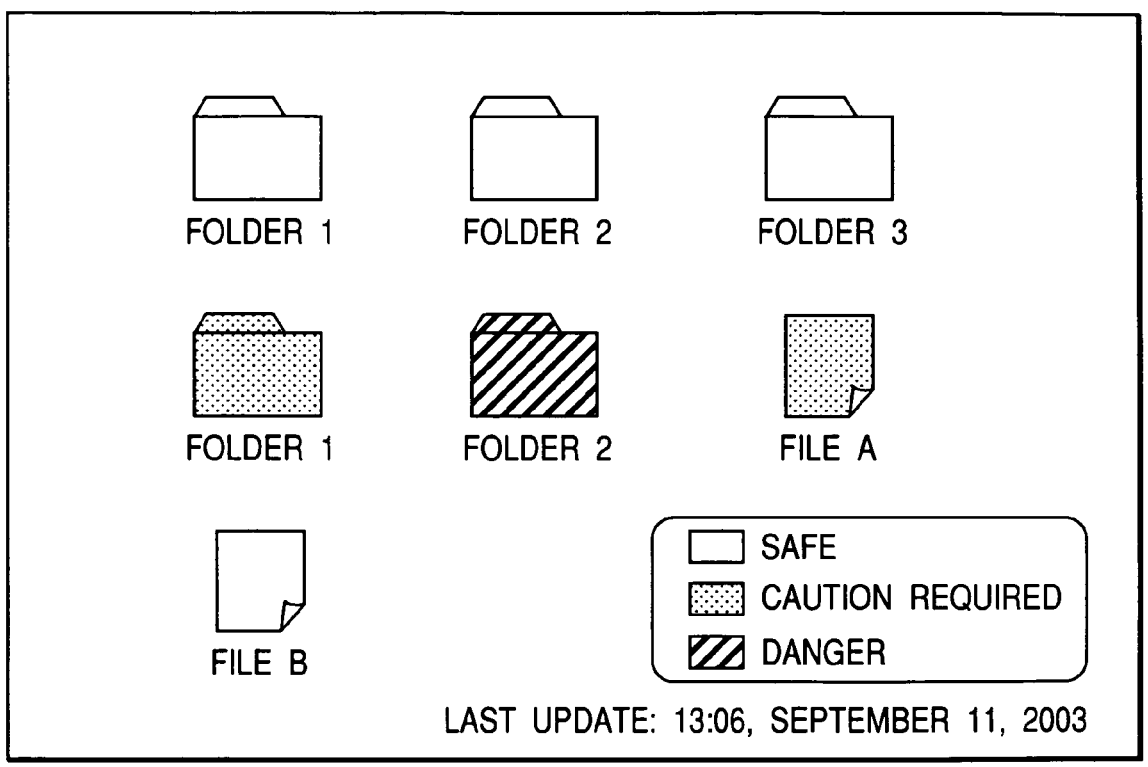
FIG. 8 is a drawing showing a first example of the risk value display in the embodiment of the present invention.

FIG. 8 is a drawing showing a first example of the risk value display in the embodiment of the present invention;

The first display example is a list using icons to shows folders and files. In this display example, the files and folders are grouped according to their risk range (for example, "Safe" "Caution Required" and "Danger") and patterns or colors are used to identify in what group the file/folder belongs. The folders groups are set according to the files with the highest risk value within the folder. In other words, if one file inside a folder is grouped into the "Danger" risk value, then folders belonging to that file are classified as "Danger" and are displayed with a "Danger" notice.

In the first display example, the display shows in what danger group the folder/file belongs so the information leakage danger level can be easily and immediately understood and the attention of the administrator attracted. The folder risk values are displayed while set in the order of highest risk value among files in the folder, so the administrator can speedily and quickly know if there are files with a high danger of information leakage. For example, without having to open the folder, one can known that there is a file with a "Danger" risk value inside that folder.

Also if a folder for example contains one file with a "Danger" risk value, and 100 files with a "Safe" risk value, and the folder group is decided by the average number of files contained in that folder, then that folder becomes a "Safe" group and a file with a "Danger" risk value might be missed or overlooked. However, in the first display example, a file with a "Danger" risk value will not be overlooked.

Figure 9:
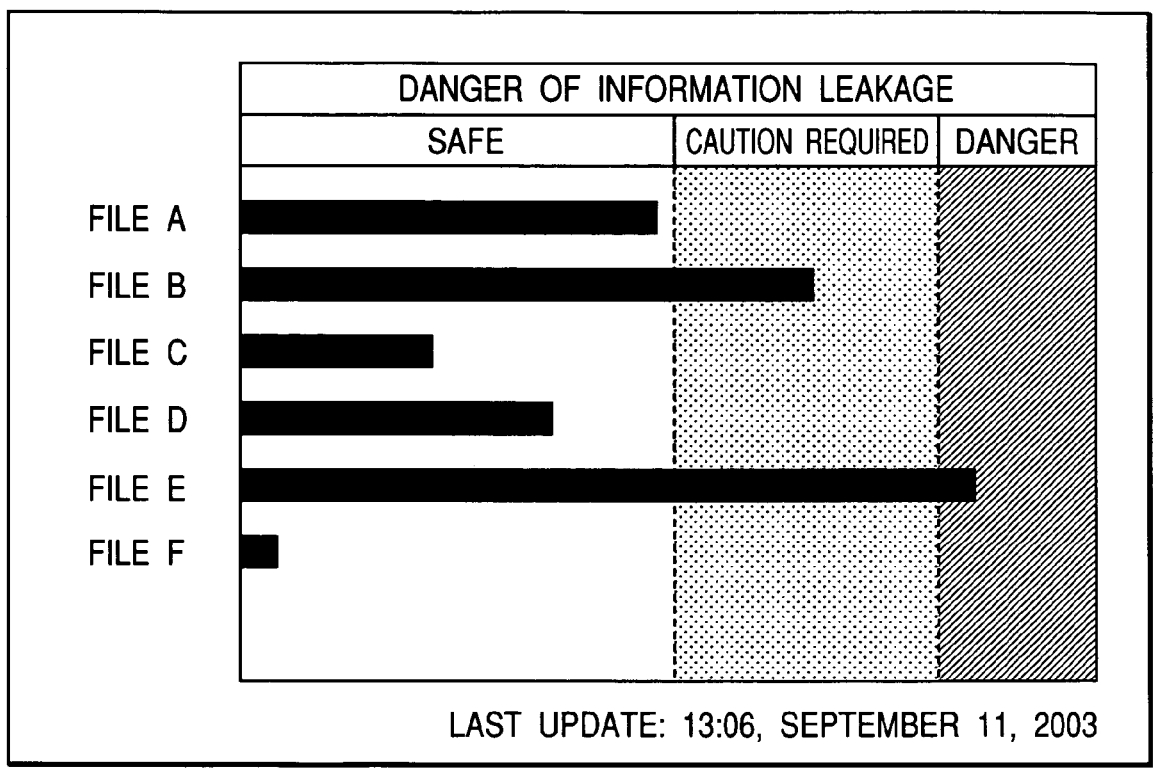
FIG. 9 is a drawing showing a second example of the risk value display in the embodiment of the present invention.

FIG. 9 is a drawing showing the second risk value display in the embodiment of the present invention.

In the second display example, the risk values of multiple specified files (or even just one file) are displayed on a bar graph in real time. Besides displaying the risk values as specific numerical values, the "Safe" "Caution Required" and "Danger" are grouped within a value range by threshold and shown in a display the administrator can easily and immediately understand.

Date/times specified in the past and risk values for a period may also be displayed as well as the current risk value status.

Figure 10:
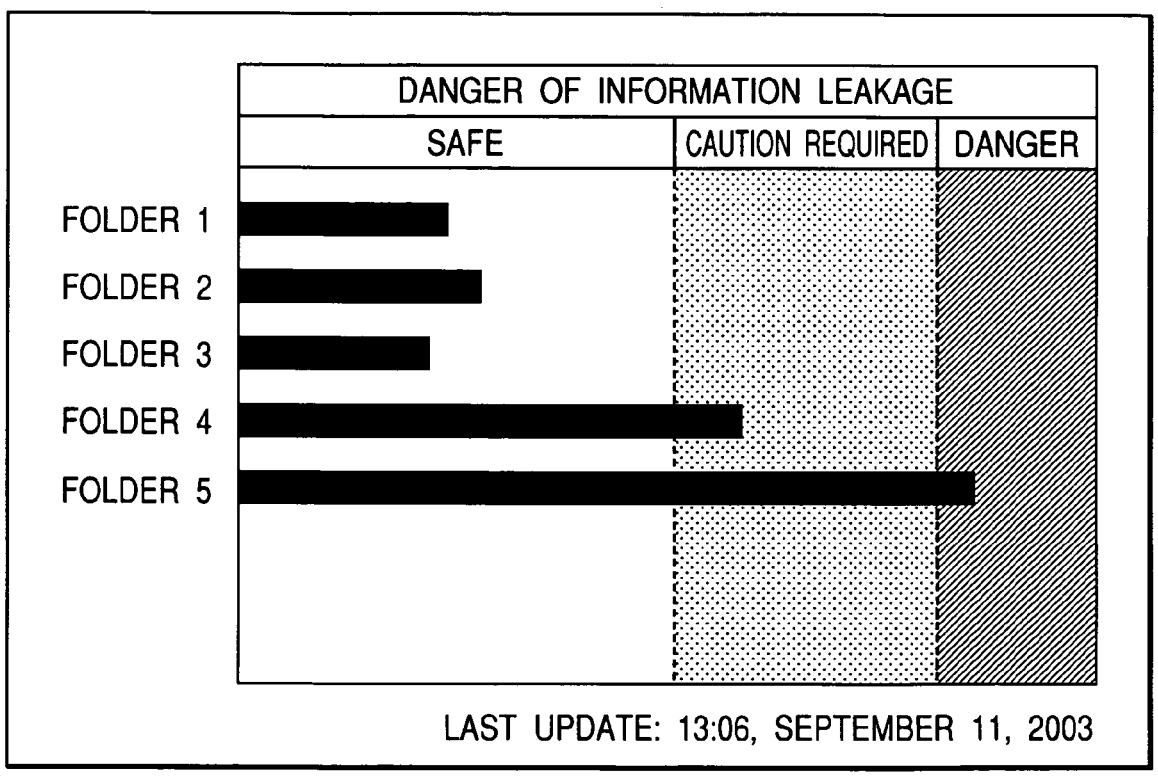
FIG. 10 is a second example of the risk value display in the embodiment of the present invention.
Figure 11:
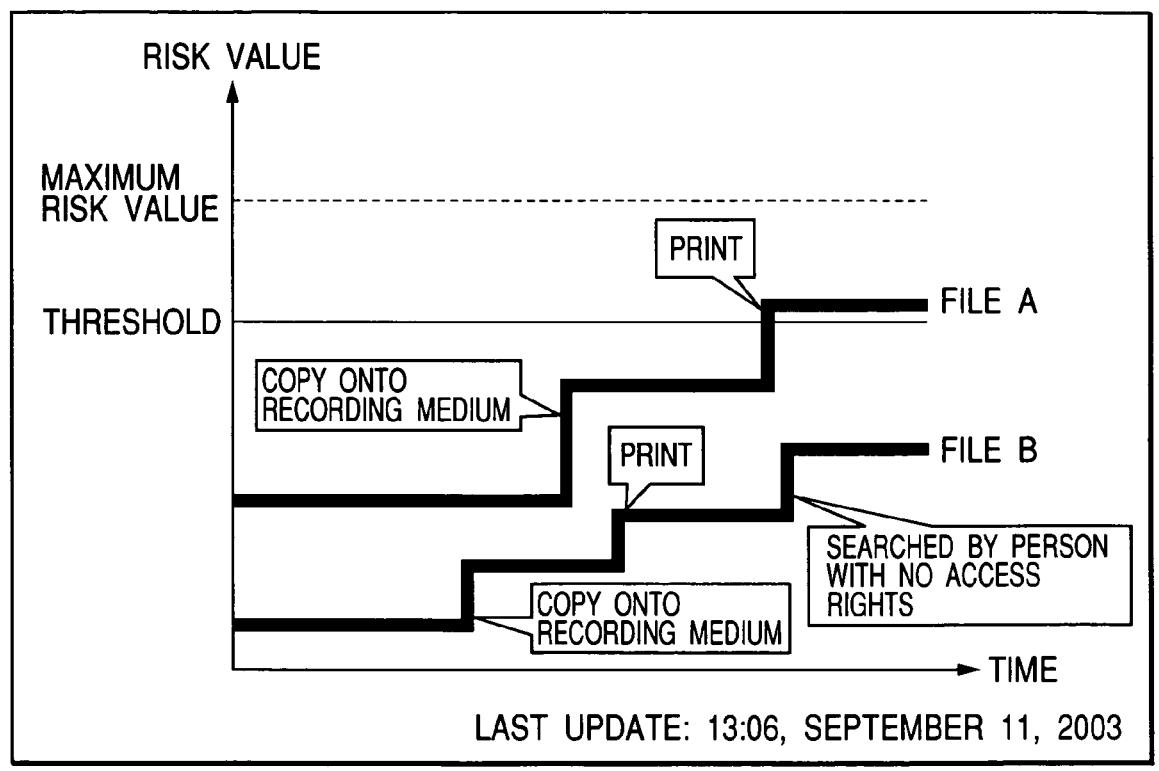
FIG. 11 is a third example of the risk value display in the embodiment of the present invention.
Figure 12:
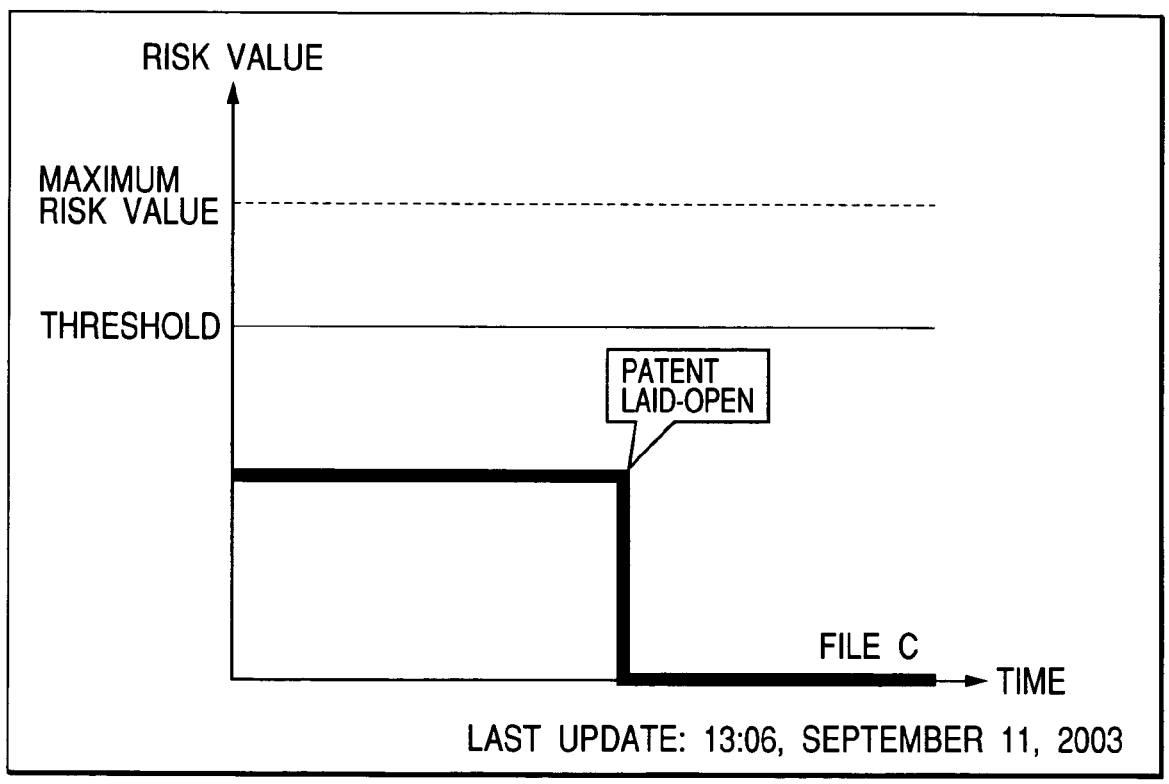
FIG. 12 is a third example of the risk value display in the embodiment of the present invention.
Figure 13:
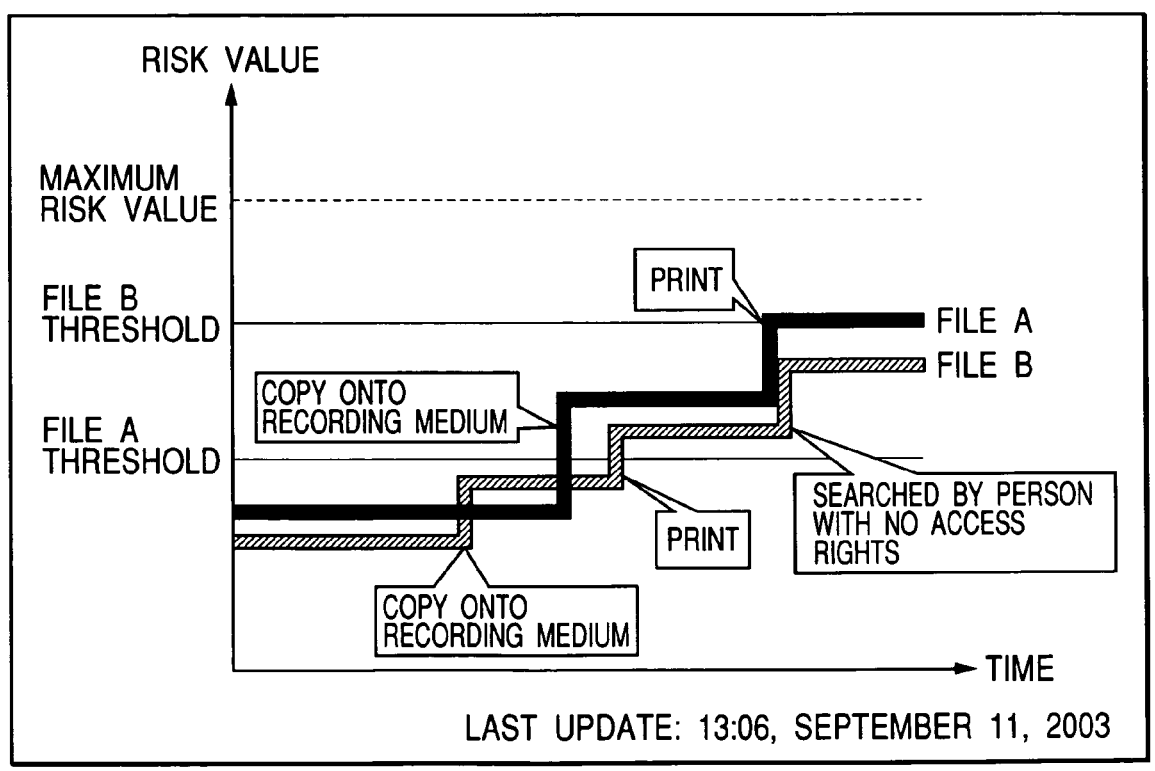
FIG. 13 is a third example of the risk value display in the embodiment of the present invention.

Besides displaying each file, the second display example also shows statistical figures for average values, maximum values and standard deviations of risk values for all files in designated management units such as folders (FIG. 10), file servers, and subnets on a bar graph in real time or may also be a history display on a line graph (See FIG. 11 to FIG. 13.).

The second display example in this way shows a bar graph of risk values for a number of specified files so that though not at a level to trigger corrective action, a countermeasure can be taken beforehand for files with high risk values and the information management safety further enhanced. Showing the display on a graph makes the display easy and quick to understand and draws the attention of the administrator.

By showing a display in these management units at different levels, the file administrator and locations where many factors are causing to risk values to increase can be understood. The administrator can therefore be instructed about important locations (folder, servers, etc.) where countermeasures to prevent information leaks are needed. Information can in this way be presented that forms a basis for an overall review of system audits, user instruction, an information leak countermeasures.

FIG. 11, FIG. 12 and FIG. 13 are graphs showing the third risk display example in the embodiment of the present invention. FIG. 11 and FIG. 12 show examples of the first risk value calculation method. In these examples, a common risk value threshold is set for all files. The example in FIG. 13 shows the second risk value calculation method in which a risk value threshold is set for all files.

In the third risk display example, a history of risk value changes for multiple specified files (or even just one file) in a specified period are displayed on a line graph.

The causes that made the risk value change can also be shown with the graph at this time as shown in FIG. 11. Detailed information on causes that changed the risk values can also be shown on the graph as needed by the administrator (for example by the administrator designating a cause display location on the screen). Also when risk values are set to be updated (rewritten) according to progress of a task, the cause of the update in risk values can also be displayed as shown in FIG. 12.

Besides changes in the history of the risk value up to the current time, a history of the risk value can also be shown for a designated past period.

The third risk display example can therefore show (past) changes over time in the risk value up to the present time along with their causes. This display therefore allows investigating causes of increased danger of information leakage and frequently occurring phenomenon for providing information for implementing corrective action.

Using the third display example with the second (risk value) calculation method (See FIG. 13.) allows displaying risk value thresholds for each file. Causes of increased danger of information leakage and frequently occurring phenomenon can therefore be investigated, and information provided for implementing corrective action.

Figure 14:
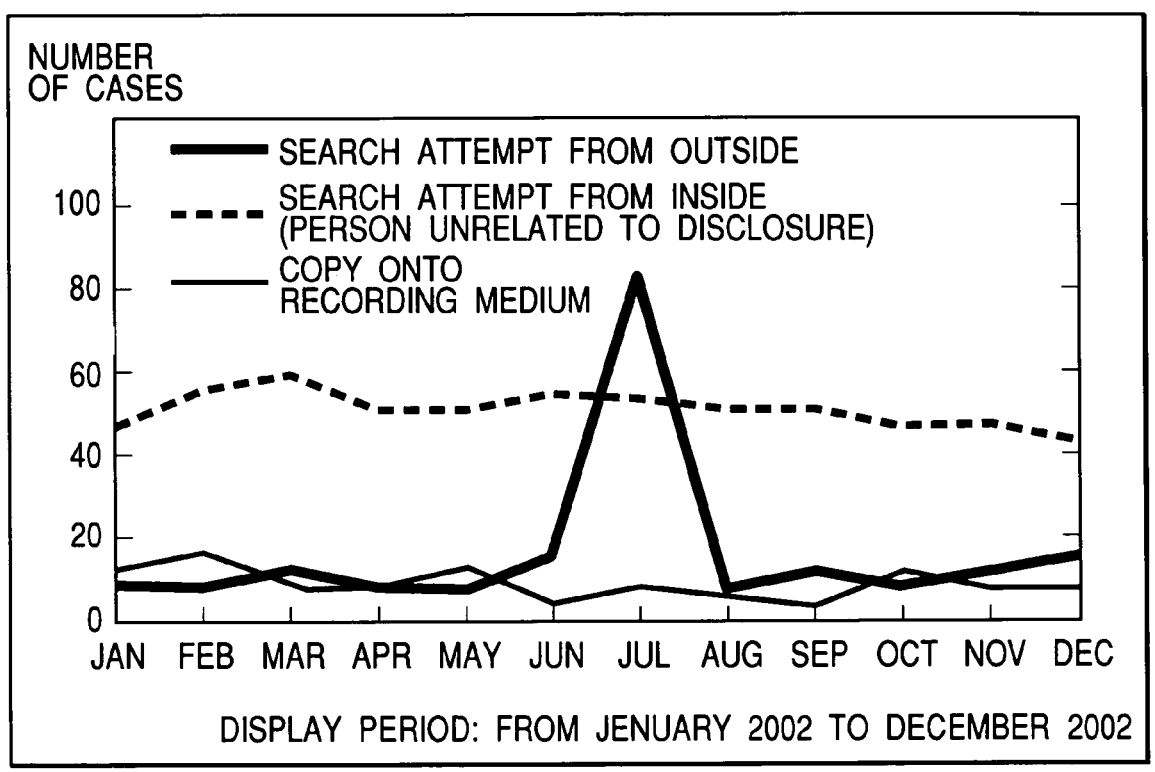
FIG. 14 is a fourth example of the risk value display in the embodiment of the present invention.

FIG. 14 is a drawing showing the fourth risk value display example in the embodiment of the present invention.

In the fourth display example, the number of cases with risk value fluctuation causes over a specified period is displayed on a line graph for each type of cause of risk value fluctuation. The display may be shown in a bar graph instead of a line graph. The accumulated number of cases may be shown instead of the number of cases occurring in each period.

The fourth display example in this way displays the number of (past) cases of risk value fluctuation causes up to the current time so that the periods and the causes of information leakage can be identified and information can be provided to the administrator for deciding on what causes the main prevention effort should be made. Information on the frequency that each cause occurs can be utilized to review the risk value fluctuation amounts that were initially set. So the fluctuation amounts can be lowered for example for risk fluctuation causes that have a low frequency of occurrence.

The present invention provides an information management system ideal for managing information containing asset values, and for evaluating the risk of leakage of confidential information of a company and managing that confidential information.

What is claimed is:

1. An information management system comprising:
a storage device for storing information containing asset values;
a file access information report section for monitoring access to information stored in said storage device;

a file attribute information management section for managing information on file attributes stored in said storage device;

a risk value processor for calculating risk values of said information based on attribute information managed by said file attribute information management section and monitoring results from said file access information report section; and a corrective action initiator for taking measures to correct leaks of said information based on results calculated by said risk value processor.

2. An information management system according to claim 1, wherein said risk value processor calculates a risk value of the information based on results monitored by said file access information report section, and on fluctuations in said risk value, and fluctuations over the passage of time in the asset values that are attribute information monitored by said file attribute information management section; and wherein said corrective action initiator evaluates risk by utilizing said calculated risk values.

3. An information management system, comprising: a storage device for storing information containing asset values;

a packet capturing section for capturing packets input and output to said storage device;

a packet analysis section for analyzing packets captured by said packet capturing section;

a file information acquisition section for managing attribute information among information stored in said storage section;

a risk value processor for calculating risk value information based on attribute information managed by said file information acquisition section, and by results analyzed by said packet analysis section; and a corrective action initiator for implementing corrective action to correct leakage of said information based on results calculated by said risk value processor.

4. An information management server connected to a file server, which comprises a storage device for storing information containing asset values, a file access information report section for monitoring access to information stored in said storage device, and a file attribute information management section for managing information on file attributes stored in said storage device, said server further comprising:

a file access information acquisition section for collecting monitoring results collected by said file access information report section;

a risk value processor for calculating risk value information based on attribute information managed by said file attribute information management section, and based on monitoring results collected by said file information acquisition section; and a corrective action initiator for taking measures to correct leaks of said information based on results calculated by said risk value processor.

5. An information management server according to claim 4, comprising:

a risk value history storage section for storing risk value information calculated by said risk value processor; and a management information processor for calculating changes accompanying the passage of time in said risk value information by using past risk value information acquired from said risk value history storage section, and reporting said calculated changes to the administrator.

6. An information management server comprising:

a storage device for storing information containing asset values;

a file access information report section for monitoring access to information stored in said storage device;

a file attribute information management section for managing information on file attributes stored in said storage device;

a file access information acquisition section for collecting monitoring results collected by said file access information report section;

a risk value processor for calculating risk value information based on attribute information managed by said file attribute information management section, and based on monitoring results collected by said file access information report section; and a corrective action initiator for taking measures to correct leaks of said information based on results calculated by said risk value processor.

7. An information management server connected to a file server, which comprises a storage device for storing information containing asset values, said server further comprising:

a packet capturing section for capturing packets input and output to said storage device;

a packet analysis section for analyzing packets captured by said packet capturing section;

a file information acquisition section for collecting attribute information among information stored in said storage section;

a risk value processor for calculating risk value information based on attribute information collected by said file information acquisition section, and results analyzed by said packet analysis section; and a corrective action initiator for implementing corrective action to correct leakage of said information based on results calculated by said risk value processor.

8. An information management system control method, said system having a storage device for storing information containing asset values, comprising:

monitoring access to information stored in said storage device;

managing attribute information among information stored in said storage device;

calculating a risk value of said information based on results from monitoring access to said information, and said managed attribute information; and performing corrective action to correct leakage of said information based on results calculated by a risk value processor.

9. An information management system control method, said system having a storage device for storing information containing asset values, comprising:

analyzing a packet for input and output to said storage device;

managing attribute information among information stored in said storage device;

calculating a risk value of said information based on results from analyzing said packet, and said managed attribute information; and performing corrective action to correct leakage of said information based on results calculated by a risk value processor.

10. A machine-readable medium containing at least one sequence of instruction for controlling a computer for implementing functions of an information management system containing a storage device for storing information containing asset values, wherein the instruction, when executed, causes the information management system to:
monitor access to information stored in said storage device;
a means for managing attribute information among information stored in said storage device;
calculate a risk value of said information based on results from monitoring access to said information, and said managed attribute information; and
perform corrective action to correct leaks of said information based on results calculated by a risk value processor.

11. A machine-readable medium containing at least one sequence of instruction for controlling a computer for implementing functions of an information management system containing a storage device for storing information containing asset values, wherein the instruction, when executed, causes the information management system to:
analyze a packet for input and output to said storage device, and a means for managing attribute information among information stored in said storage device;
calculate a risk value of said information based on results from analyzing said packet, and said managed attribute information; and
perform corrective action to correct leaks of said information based on results calculated by risk value processor.

* * * * *